United States Patent [19]
Koch

[11] Patent Number: 5,793,628
[45] Date of Patent: Aug. 11, 1998

[54] MULTI-PHASE PULSE-WIDTH-MODULATION POWER CONVERTER

[75] Inventor: James K. Koch, Rocklin, Calif.

[73] Assignee: Hewlett-Packard Company, Palo Alto, Calif.

[21] Appl. No.: 846,445

[22] Filed: Apr. 30, 1997

[51] Int. Cl.$^6$ ............................................. H02M 5/06
[52] U.S. Cl. ............................................. 363/152
[58] Field of Search ............................ 363/2, 8, 9, 10, 363/148, 149, 152, 153

[56] References Cited

U.S. PATENT DOCUMENTS

| | | | |
|---|---|---|---|
| 4,010,463 | 3/1977 | Kay | 341/116 |
| 5,187,654 | 2/1993 | Felippe | 363/154 |
| 5,694,094 | 12/1997 | Meuth et al. | 332/119 |

Primary Examiner—Matthew V. Nguyen
Attorney, Agent, or Firm—David A. Plettner

[57] ABSTRACT

An N-phase power converter uses a ring oscillator to generate a series of switching signals having substantially equally distributed phase relationships with respect to one another. The ring oscillator is formed from an alternating string of inverters and RC networks with the voltage over each capacitor of each RC network provided to a phase comparator. The phase comparators shape a saw-tooth waveform present over each capacitor into a pulse-width-modulated switching signal that drive switches which alternately charge and discharge inductors. One terminal of each inductor is coupled to common node at which the converter output voltage is provided. A feedback unit generates a feedback signal is used to vary the pulse width of the switching signals.

3 Claims, 5 Drawing Sheets

MULTI-PHASE PULSE-WIDTH-MODULATION POWER CONVERTER

FIELD OF THE INVENTION

The present invention relates to power converters. More specifically, the present invention relates to a power converter that uses a ring oscillator to generate a series of switching signals having substantially equally distributed phase relationships with respect to one another.

DESCRIPTION OF THE RELATED ART

For a long period of time it was common to operate most of the integrated circuits within a microprocessor-based computer system at 5 volts. For example, all generations of Intel x86 processors up to the 66 MHz i486DX2® and 66 MHz Pentium® CPUs operated at 5 volts. However, as sub-micron integrated circuit technologies have become common, it has also become common to drop the supply voltage. One reason for doing so is to decrease the power dissipated by each gate of an integrated circuit. Another reason for doing so is that as the feature sizes of devices etched into an integrated circuit get smaller, there is a greater probably of electrical breakdown at 5 volts.

Accordingly, with the advent of Intel's 100 MHz i486DX4® and 75 MHz Pentium® CPUs, Intel microprocessors operated at 3.3 volts. More recently, Intel has introduced a line of Pentium® MMX CPUs that operate at an internal core voltage of 2.85 volts.

With 486 and Pentium® class CPUs operating at voltages of 3.3 and 2.85 volts, it was common to simply use a power regulator IC incorporating a power transistor to drop the voltage from 5 volts to the voltage required by the CPU. Such regulator ICs are very inexpensive, and dissipate heat based on the supply current and the voltage drop provided by the regulator. At the current levels required by these CPUs, the amount of heat dissipated is not substantial and the amount of energy dissipated as heat does not pose a significant burden for a computer system's power supply or cooling system.

However, the trend toward lower CPU operating voltages will continue. In addition, the trend toward higher transistor counts will also continue. It is anticipated that within five years, future generations of processors will require currents on the order of 100 amps at voltages on the order of 1 volt. At such current levels, it is not prudent or desirable to use a power regulator that incorporates one or more power transistors to reduce voltage levels by converting excess voltage to heat.

SUMMARY OF THE INVENTION

The present invention is a power converter that uses a ring oscillator to generate a series of switching signals having substantially equally distributed phase relationships with respect to one another.

In one embodiment of the invention, an alternating string of inverters and RC networks form a ring oscillator, with the voltage over each capacitor of each RC network provided to a phase comparator. The phase comparators shape a sawtooth waveform present over each capacitor into pulse-width-modulated switching signals that drive switches which alternately charge and discharge inductors. One terminal of each inductor is coupled to common node at which the converter output voltage is provided.

The converter output voltage is also provided to a feedback unit that generates a feedback signal that is supplied to the power terminals of the inverters. In another embodiment, the inverters are supplied by a constant voltage source and the feedback unit supplies a feedback signal to the comparators.

The present invention provides a low-cost power converter ideally suited for the next generation of low voltage, high current CPUs.

DETAILED DESCRIPTION OF THE PREFERRED EMBODIMENTS

Figure 1:
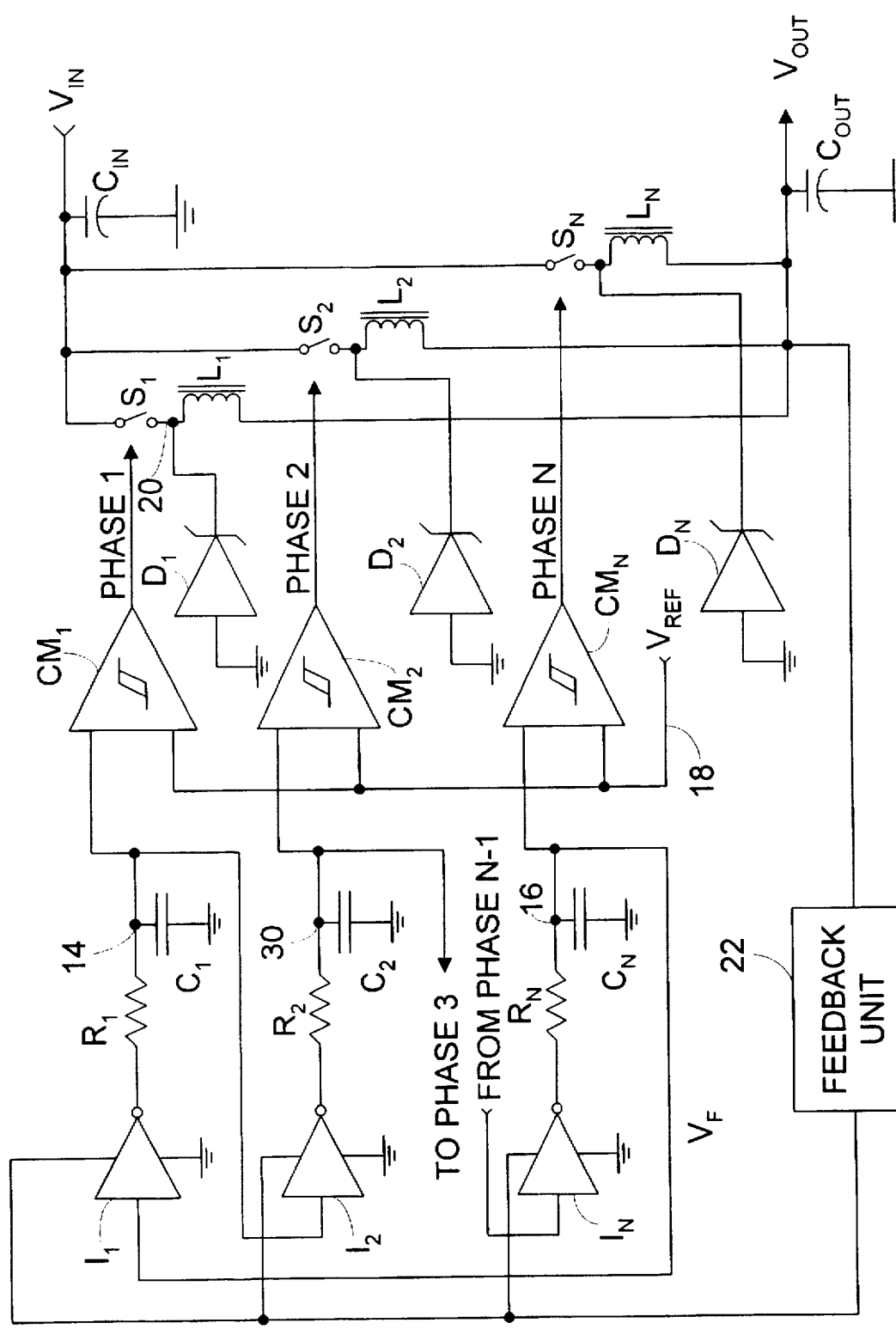
FIG. 1 is a schematic diagram of an N-phase power converter in accordance with the present invention.

Next generation CPUs are going to require significant current levels at very low voltages. In addition, next generation computer systems will employ multiple CPUs in each computer, such as systems having 64 or more CPUs. Accordingly, it is not feasible to use power transistor-based regulators that simply convert excess voltage into heat. For example, a computer system having 32 CPUs with each CPU drawing 100 amps at 1 volt, and a 5 volt supply that must be converted into a 1 volt supply using power transistor-based regulators as described above must dissipate over 12,000 watts as heat. This is clearly not acceptable.

It is known in the art to use various types of switching power converters to perform DC-to-DC conversion. Such power converters perform voltage conversions very efficiently, and do not dissipate much heat during the conversion process. Basically, switching power converters operate by applying a switching signal to a transistor to alternately charge and discharge an LC network. Feedback is used to alter the duty cycle of the switching transistor to maintain the output supply voltage at the desired level.

Most prior art switching power converters are single-phase converters. One problem with single-phase converters is that without adequate filtering, they produce a fairly substantial RMS ripple current at the converter's input and output. Therefore, sufficient capacitance must be provided to remove the ripple. However, capacitors also have resistance, so converter efficiency is reduced because of the ripple current through the capacitors.

Another problem associated with single-phase power converters is that they respond rather slowly to changes in load. In order to remain stable, a single-phase power converter must have a feedback loop bandwidth about 10 times less than the switching frequency of the converter. Therefore, a single-phase switching power converter having a 100 KHz switching frequency will require about 10 µS to respond to a large change in load.

The load provided by a CPU can change drastically in a very short time. For example, CPUs in laptop computers may enter a sleep mode to save energy, but must return to normal operation upon a key press. Likewise, the current consumed by a CPU may vary drastically as various types of code are executed. For example, one loop may exercise a small portion of a CPU's logic gates, then jump to another loop that exercises a majority of the gates. Modem CPUs, such as CPUs based on Hewlett-Packard's PA-RISC architecture, may undergo a current swing of ±10 amps in as little as 0.5 μS. It is expected that in the future, the magnitude of the current swing may increase by a factor of 10. Since a single-phase switching power converter having a 100 KHz switching frequency will require about 10 μS to respond to such a change in load, capacitors must be provided to supply current during the period before which the converter responds to the load change.

The present invention is an N-phase switching power converter that uses a ring oscillator to generate N switching signals having equally spaced phase relationships with respect to each other. Such oscillators are also known in the art as phase shift oscillators. By using an N-phase switching power converter, the problems discussed above are minimized. First, each phase of the converter produces RMS ripple current, but the ripple currents of each phase are out of phase which each other and tend to substantially cancel each other when the outputs of the phases are summed together. Therefore, less capacitance is required at the input and output of the converter to filter ripple current.

Second, by using an N-phase switching power converter, the time required to respond to a change in load is reduced by a factor of N. For example, a three phase switching power converter having a 100 KHz switching frequency will require about 3.3 μS to respond to substantial a change in load. Since the response time is increased, the amount of capacitance required to supply current during the interval before which the converter responds may also be reduced by a factor of N. In addition, reducing the capacitance allows a switching power converter to be even more responsive.

FIG. 1 is a schematic diagram of an N-phase power converter 10 in accordance with the present invention. Power converter 10 includes inverters $I_1$, $I_2$, and $I_N$, resistors $R_1$, $R_2$, and $R_N$, capacitors $C_1$, $C_2$, $C_N$, $C_{IN}$, and $C_{OUT}$, comparators $CM_1$, $CM_2$, and $CM_N$, diodes $D_1$, $D_2$, and $D_N$, switches $S_1$, $S_2$, and $S_N$, and inductors $L_1$, $L_2$, and $L_N$.

Inverters $I_1$, $I_2$, and $I_N$ form a ring oscillator, with the output of each inverter driving an RC network. For example, the output of inverter $I_1$ is coupled to a first terminal of resistor $R_1$ at node $I_2$, a second terminal of resistor $R_1$ is coupled to a first terminal of capacitor $C_1$ at node 14, and a second terminal of capacitor $C_1$ is coupled to ground. The voltage over each capacitor is then fed to the next inverter in the ring. For example, the voltage at node 14 is fed to the input of inverter 12, and the voltage at node 16 (the voltage over capacitor $C_N$) is fed back to the input of inverter $I_1$ to complete the feedback loop of the ring. As used herein, the term "ground" will be used generically to refer to a common base voltage of the circuit. Those skilled in the art will recognize that the present invention will operate without a conduction path to a true ground potential.

The voltage over each ring oscillator varies with a time constant determined by the RC network at the output of each inverter, and traverses a saw-tooth shaped waveform. To convert the saw-tooth waveform into a square wave suitable for switching a transistor, the voltage over each of the ring oscillator capacitors is also used to drive a comparator having a certain amount of hysteresis. The hysteresis ensures a clean square wave at the comparator output. For example, a first input of comparator $CM_1$ is driven by node 14. Likewise, a first input of comparator $CM_N$ is driven by node 16.

Connected to a second output of each comparator is a reference voltage $V_{REF}$ supplied from node 18. Each comparator converts the saw-tooth waveform at the first input of the comparator into a square wave at the output of the comparator, with the value of $V_{REF}$ determining the duty cycle of the square wave. Accordingly, the comparators act as duty cycle modulators by providing outputs having pulse widths determined by the amplitudes of the saw-tooth waveforms and the reference voltage $V_{REF}$.

The output of each comparator is used to drive a switch, which may be a switching transistor or any other type of suitable switch known in the art. For example, the output of comparator $CM_1$ is labeled Phase1 and drives switch $S_1$. In turn, each switch alternately connects and disconnects a first terminal of an inductor to a supply voltage. For example, switch $S_1$ alternately connects and disconnects supply voltage $V_{IN}$ to a first terminal of inductor $L_1$ at node 20. Also coupled to the first terminal of each inductor is the output of a diode that has an input coupled to ground. For example, the output of diode $D_1$ is coupled to node 20, and the input of diode $D_1$ is coupled to ground.

A second terminal of each inductor is coupled to the output supply voltage $V_{OUT}$. For example, the second terminal of inductor $L_1$ is coupled to $V_{OUT}$. Capacitor $C_{IN}$ is coupled between input supply voltage $V_{IN}$ and ground to filter switching noise. Also, capacitor $C_{OUT}$ is coupled between output supply voltage $V_{OUT}$ and ground to filter output voltage ripple and switching noise.

Inductors $L_1$, $L_2$, and $L_N$, diodes $D_1$, $D_2$, and $D_N$, and capacitors $C_{IN}$ and $C_{OUT}$ form a summing network. The first terminal of each inductor forms a phased input portion of the summing network, with each phased input portion coupled to one of the switches to allow that portion to be selectively charged by the voltage $V_{IN}$ and discharged by ground via a diode. Collectively, the second terminals of each of the inductors form an output portion of the summing network, which adds the currents provided by each inductor to form (in combination with capacitor $C_{OUT}$) the converter output voltage $V_{OUT}$.

Feedback unit 22 also has an input coupled to output supply voltage $V_{OUT}$. Unit 22 compares voltage $V_{OUT}$ to an internally generated target reference voltage and generates a supply voltage for the inverters based on the error between the voltage $V_{OUT}$ and the target voltage. This will be described in greater detail below with reference to FIGS. 2 and 3.

For the purpose of describing power converter 10 in greater detail, assume that N is three. Therefore, node 24 is coupled to the input of inverter $I_N$, which of course may also be referred to as $I_3$ if N is equal to three.

Figure 2:
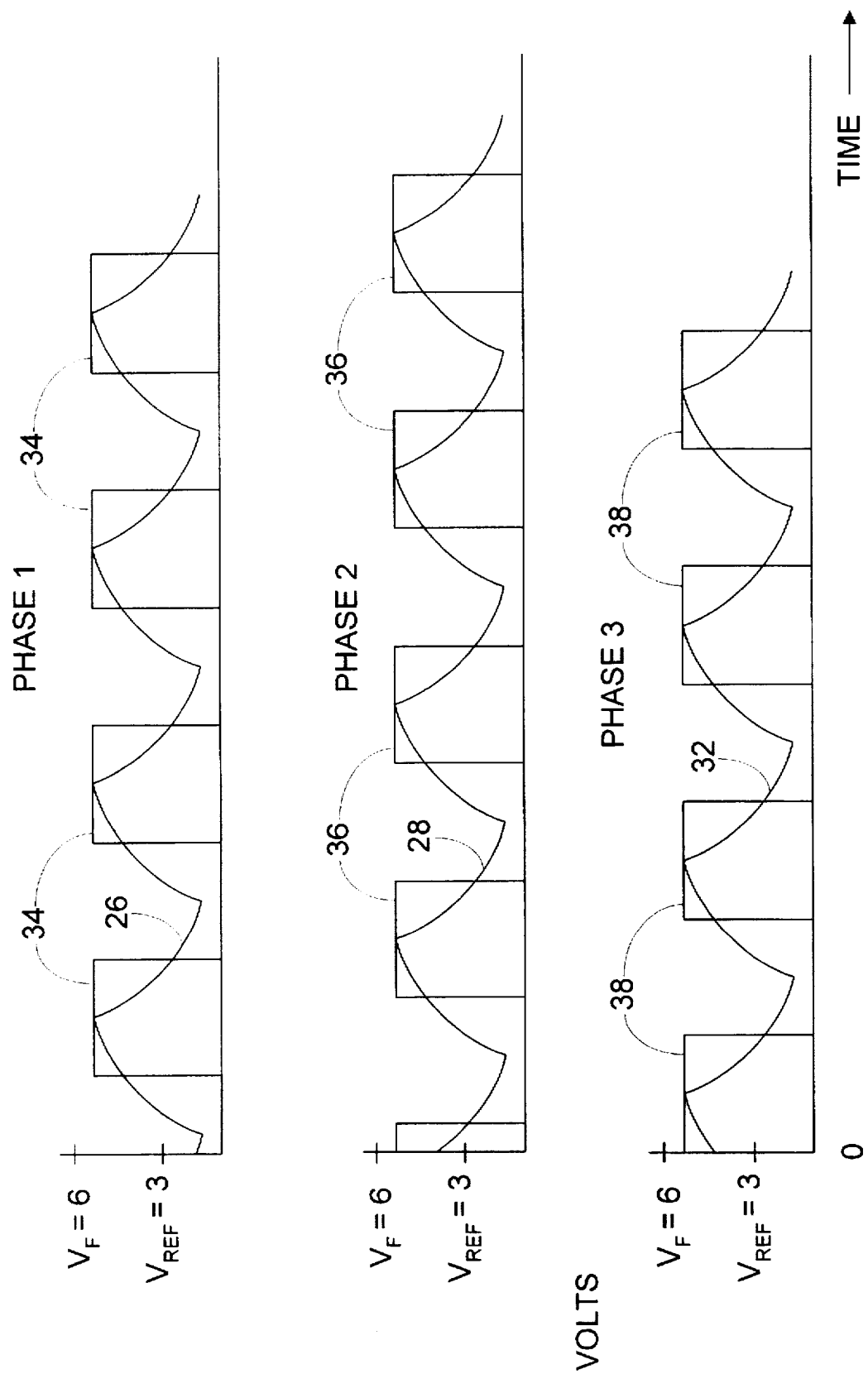
FIG. 2 shows three graphs labeled Phase 1, Phase 2, and Phase 3, which represent signals found at various nodes of the power converter of FIG. 1.

FIG. 2 shows three graphs labeled Phase 1, Phase 2, and Phase 3. On the graph labeled Phase 1, curve 26 represents the voltage at node 14. Likewise, on the graph labeled Phase 2, curve 28 represents the voltage at node 30, and on the graph labeled Phase 3, curve 32 represents the voltage at node 16.

In FIG. 2, the feedback voltage $V_F$ supplied by feedback unit 22 is approximately 6 volts. When the voltage at the input of an inverter drops below the "low" threshold of the inverter, the output goes high and begins charging the capacitor of the RC network coupled to the inverter. Likewise, when the voltage at the input of an inverter rises above the "high" threshold of the inverter, the output goes low and begins discharging the capacitor of the RC network coupled to the inverter.

In FIG. 2, the reference voltage applied to the comparators is approximately 3 volts. Accordingly, the output of a comparator will go high when the voltage over the capacitor coupled to the comparator rises above 3 volts and will go low when the voltage over the capacitor drops below 3 volts. Pulses 34 represent the output of comparator $CM_1$ in FIG. 1 given the parameters shown in FIG. 2. Likewise, pulses 36 represent the output of comparator $CM_2$, and pulses 38 represent the output of comparator $CM_N$. These pulses drive switches $S_1$, $S_2$, and $S_N$, as described above.

Now assume that the load on power converter 10 increases, such as would be the case if a CPU was placed in an active mode after being in a suspended mode. This would cause a slight decrease in the voltage $V_{OUT}$, which would cause feedback unit 22 to increase the feedback voltage $V_F$.

Figure 3:
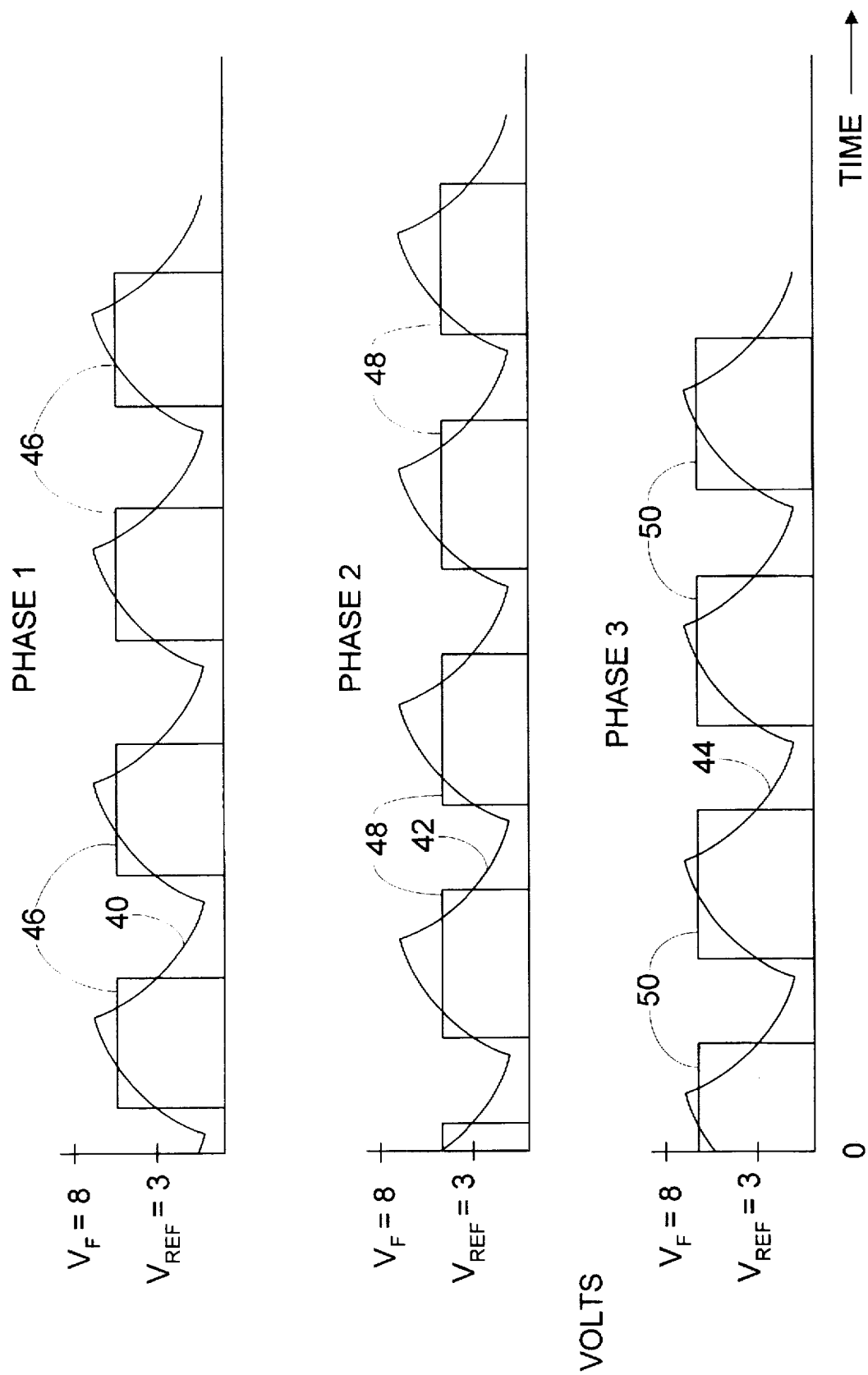
FIG. 3 shows three graphs similar to those shown in FIG. 2, but operating at a different feedback voltage.

In FIG. 3, feedback unit 22 has increased the feedback voltage $V_F$ to 8 volts. Similar to FIG. 2, in FIG. 3 on the graph labeled Phase 1, curve 40 represents the voltage at node 14, on the graph labeled Phase 2, curve 42 represents the voltage at node 30, and on the graph labeled Phase 3, curve 44 represents the voltage at node 16. Likewise, pulses 46 represent the output of comparator $CM_1$, pulses 48 represent the output of comparator $CM_2$, and pulses 50 represent the output of comparator $CM_N$.

Figure 4:
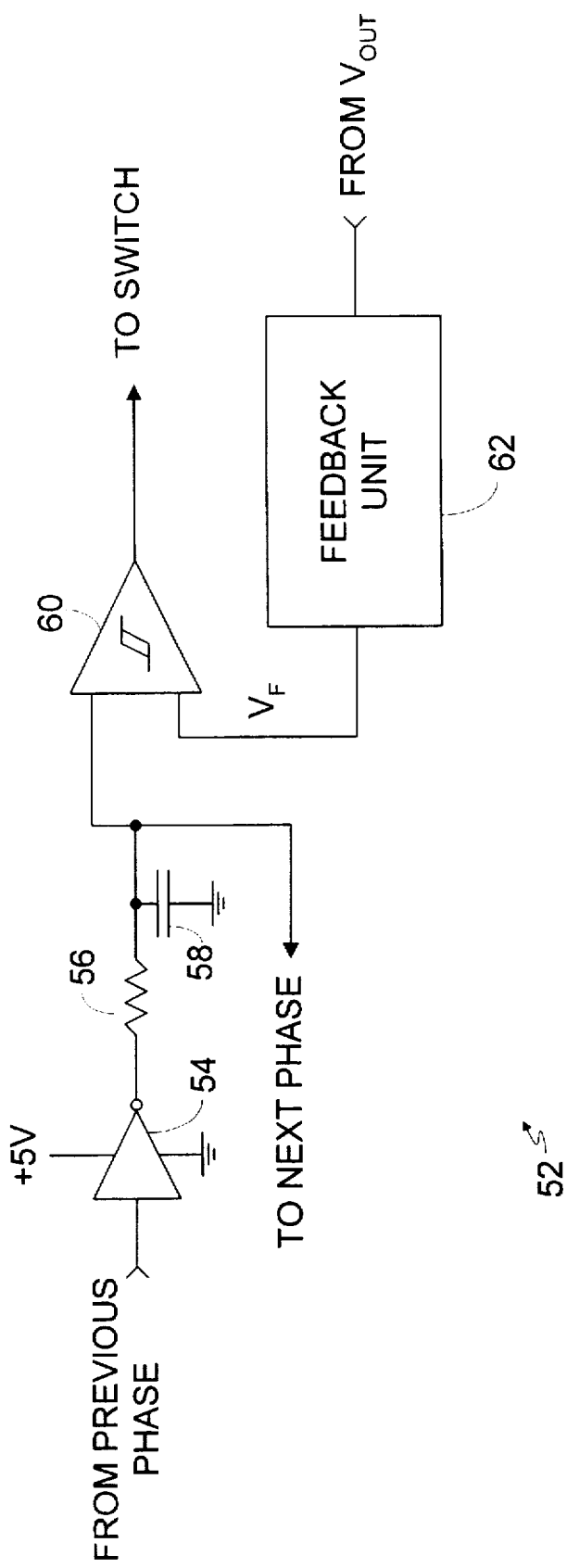
FIG. 4 is a schematic diagram of an oscillator stage that is part of another embodiment of the present invention.

FIG. 4 is a schematic diagram of an oscillator stage 52 that is part of another embodiment of the present invention. Stage 52 includes an inverter 54, a resistor 56, a capacitor 58, a comparator 60, and a feedback unit 62. Stage 52 operates in a manner similar to the stages shown in FIG. 1. However, in FIG. 1, the feedback voltage from feedback unit 22 was provided as the supply voltage to the inverters, while the voltage $V_{REF}$ provided to the comparators remained constant. In FIG. 4, a constant supply voltage of 5 volts is provided to inverter 54, and the output of feedback unit 62 is supplied to comparator 60.

With reference to the graph labeled Phase 1 in FIG. 2 and power converter 10 in FIG. 1, when the voltage $V_{OUT}$ drops slightly, curve 26 shifts up in voltage. This causes the intersection of curve 26 and the constant reference voltage $V_{REF}$ to produce wider pulses. In contrast, when the voltage $V_{OUT}$ of a power converter employing oscillator stages such as stage 52 in FIG. 4 drops, curve 26 remains the same, and the feedback voltage $V_F$ (which would replace $V_{REF}$ in FIG. 2) must drop in order to cause the intersection of the feedback voltage $V_F$ and curve 26 to produce wider pulses. Accordingly the sense of feedback unit 62 is the opposite of feedback unit 22. Feedback unit 22 must produce a higher feedback output $V_F$ to compensate for a lower voltage $V_{OUT}$, and feedback unit 62 must produce a lower feedback output $V_F$ to compensate for a lower voltage $V_{OUT}$.

Figure 5:
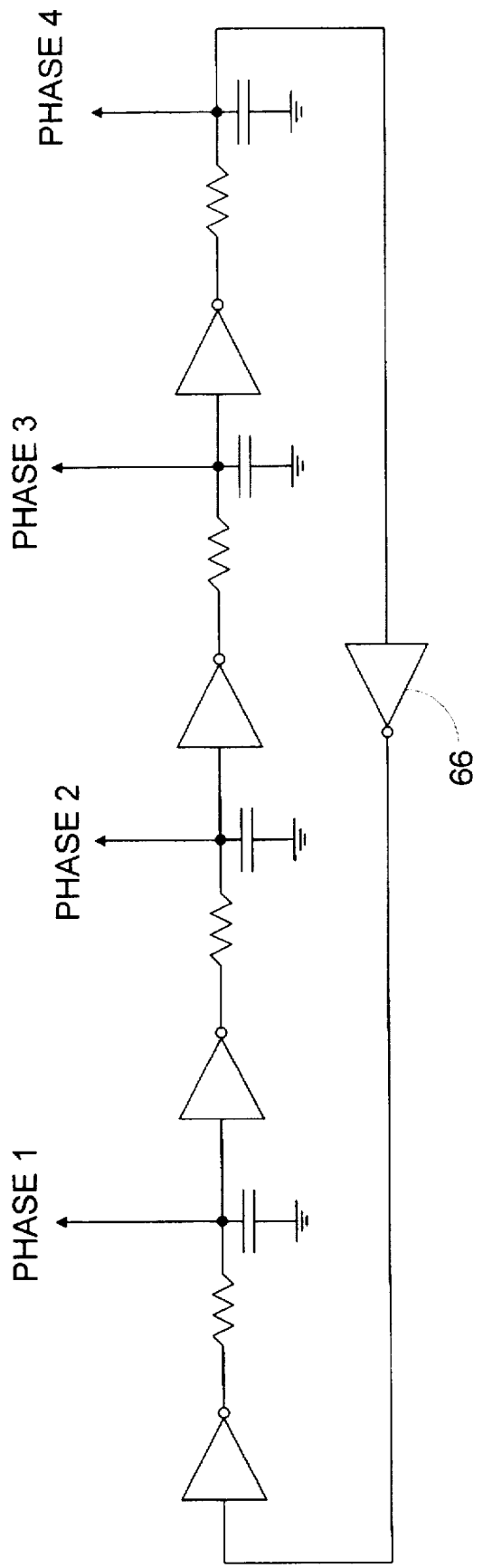
FIG. 5 is a schematic diagram of a ring oscillator for use with the present invention and having four phase outputs.

For a ring oscillator to oscillate, the number of inverters must be odd. However, in another embodiment, the present invention may be adapted to provide an even number of switched outputs. FIG. 5 is a schematic diagram of a ring oscillator 64 for use with the present invention and having four phase outputs. While oscillator 64 has an odd number of oscillators to ensure oscillation, it has an even number of RC networks. Inverter 66 is not provided with an RC network, and therefore does not significantly affect the oscillation frequency of oscillator 64. Accordingly, to adapt the present invention for use with an even number of phase outputs, an inverter without an RC network is provided in the feedback path that completes the ring oscillator.

The frequency of oscillation of the ring oscillator will depend upon the number of oscillator stages, the resistances of the resistors, the capacitances of the capacitors, and the high and low threshold values of the inverters. National Semiconductor Application Note 88, which is hereby incorporated by reference, specifies that a 3-stage ring oscillator similar to that shown in FIG. 1 and constructed from National Semiconductor MM74C04 inverters will have an oscillation frequency of approximately $1/(3.3*R*C)$, where the resistance R and the capacitance C are the same for each stage of the oscillator. Accordingly, an N stage ring oscillator constructed from MM74C04 inverters will have a frequency of approximately $1/(1.1*R*C*N)$. Of course, those skilled in the art will be able to calculate the oscillation frequency of any particular oscillator, and select resistance and capacitance values accordingly.

The present invention may also be used with a variety of off-the-shelf commercially available components. For example, the TelCom TC38C46 CMOS current mode PWM controller, the data sheet for which is incorporated by reference, includes a SYNC input that may be driven directly from the output of an inverter. For example, four TC38C46 controllers may be synchronized by a ring oscillator such as oscillator 64 in FIG. 5, with the SYNC input of each controller coupled to an output of an inverter, such as output 68 of inverter 70. Alternatively, other commercially available components may be synchronized by the triangle waveforms available over the capacitors, such as the signal labeled Phase 4 in FIG. 5. However, such embodiments will not be as low-cost as the embodiment shown in FIG. 1.

The present invention is somewhat analogous to an internal combustion engine. Small single-cylinder engines are adequate for applications that require a relatively small amount of power, such as a lawn mower engine. However, as more power is required, an engine designer will typically include additional cylinders to provide a smooth and powerful source of rotational energy over a wide power band.

By using a multi-phase switching power converter, the present invention achieves similar benefits. Compared to a single-phase switching power converter having similar filtering capacitors at the converter input and output, the range of loads over which a power converter in accordance with the present invention may operate is increased because the charging times of multiple inductors may overlap and therefore minimize ripple current. Of course, the present invention may also be configured to provide a multi-phase switching power converter having load restrictions similar to a single-phase switching power converter, but with much smaller filtering capacitors.

There are other ways to form multi-phase switching signals. For example, a fast clock may be divided into slower phase shifted clocks, or a delay line may be used to form phase shifted clocks. Then the phase shifted clocks must be formed into triangle waves, so that PWM switching signals may be formed. But none are simpler and lower cost than using a ring oscillator in accordance with the present invention. A ring oscillator formed from an alternating string of inverters and RC networks ensures even phase spacing, is easy to modulate with a feedback signal, and inherently generates a saw-tooth waveform that may be used to generate the PWM switching signals. In addition, the components required to construct the present invention are all commodity components that are very inexpensive. In contrast, competing commercially available components are much more expensive.

Although the present invention has been described with reference to preferred embodiments, workers skilled in the art will recognize that changes may be made in form and detail without departing from the spirit and scope of the invention.

What is claimed is:

1. A power converter for receiving an input voltage and providing an output voltage, the power converter comprising:

a ring oscillator for generating a plurality of oscillator signals having a substantially equal phase relationship with each other;

a corresponding plurality of duty cycle modulators for converting each oscillator signal of the plurality of oscillator signals into a switching signal;

a plurality of switches;

a summing network having a plurality of phased input portions, with each phased input portion coupled to one of the plurality of switches to be charged and discharged by a charging signal derived from the input voltage, and an output portion, wherein the summing network adds the currents from the phased input portions to form the output voltage; and a feedback unit coupled to the output voltage, for comparing the output voltage to a target voltage and adjusting a duty cycle of each switching signal to minimize a difference between the output voltage and the target voltage.

2. The power converter of claim 1 wherein the ring oscillator comprises:

a plurality of oscillator stages coupled together to form a ring, with each oscillator stage of the plurality of oscillator stages having an input, and an output couple the input of a next oscillator stage in the ring, wherein each oscillator stage comprises:

an inverter having an input and an output, wherein the input of the inverter is coupled to the input of the oscillator stage;

a resistor having a first terminal coupled to the output of the inverter and a second terminal coupled to the output of the oscillator stage; and a capacitor having a first terminal coupled to the output of the oscillator stage and a second terminal coupled to a common base potential.

3. The power converter of claim 2 wherein each inverter has a power supply input coupled to the feedback unit, and the feedback unit adjusts the power supply input of each inverter to adjust a DC component of a saw-tooth waveform produced at each oscillator stage output.

* * * * *